(12) United States Patent
Baskut et al.

(10) Patent No.: US 11,090,739 B2
(45) Date of Patent: Aug. 17, 2021

(54) END-MILLS MADE OF HARD METAL AND CERAMIC COMBINED BY BRAZING METHOD

(71) Applicant: ALP HAVACILIK SANAYI VE TICARET ANONIM SIRKETI, Odunpazari/Eskisehir (TR)

(72) Inventors: Evren Baskut, Odunpazari/Eskisehir (TR); Ugur Evrensel Yilmaz, Odunpazari/Eskisehir (TR)

(73) Assignee: ALP HAVACILIK SANAYI VE TICARET ANONIM SIRKETI, Odunpazari/Eskisehir (TR)

( * ) Notice: Subject to any disclaimer, the term of this patent is extended or adjusted under 35 U.S.C. 154(b) by 115 days.

(21) Appl. No.: 15/567,065

(22) PCT Filed: Dec. 13, 2016

(86) PCT No.: PCT/TR2016/050493
§ 371 (c)(1),
(2) Date: Oct. 16, 2017

(87) PCT Pub. No.: WO2017/105367
PCT Pub. Date: Jun. 22, 2017

(65) Prior Publication Data
US 2018/0133811 A1    May 17, 2018

(30) Foreign Application Priority Data
Dec. 14, 2015 (TR) .................................. 2015/16043

(51) Int. Cl.
*B23C 5/10*    (2006.01)
(52) U.S. Cl.
CPC ............ *B23C 5/10* (2013.01); *B23C 2210/03* (2013.01); *B23C 2210/0485* (2013.01);
(Continued)

(58) Field of Classification Search
CPC ............ B23C 2240/08; B23C 2210/03; B23C 2210/0485; B23C 2210/40;
(Continued)

(56) References Cited

U.S. PATENT DOCUMENTS 7,922,428 B2 * 4/2011 Weerasinghe ........ C23C 14/042
   408/144
2002/0071949 A1 * 6/2002 Liu ........................... B23C 5/10
   428/325
(Continued)

FOREIGN PATENT DOCUMENTS

DE    2001 205514 A    7/2001
DE    10 2013 109591 A1    3/2015

OTHER PUBLICATIONS

International Search Report dated Mar. 21, 2017 for corresponding International Application No. PCT/TR2016/050493.
(Continued)

*Primary Examiner* — Sara Addisu
(74) *Attorney, Agent, or Firm* — Intellectual Property Law Group LLP (57) ABSTRACT

An end-mill comprising a shank and a cutting portion along its longitudinal axis, and formed by combining ceramic and metal based materials via a brazing method. The cutting portion includes a cutting diameter varying between 2 to 20 mm, at least one web thickness found at a blade part, at least one helix angle having a cutting edge thereon, a core diameter that is at least 0.7 times the cutting diameter, at least one corner radius found at the tip part of the blades between the flutes, and axial and radial rake angles at which a cutting operation is made. TiAlN coating is applied over the ceramic-metal based end-mill by a PVD method in order
(Continued)

to extend the service life of the end-mill, increase abrasion resistance, and minimize the welding (sticking) problem of chips on the cutting tools.

15 Claims, 5 Drawing Sheets

(52) U.S. Cl.
CPC ...... *B23C 2210/40* (2013.01); *B23C 2224/24* (2013.01); *B23C 2224/28* (2013.01); *B23C 2226/18* (2013.01); *B23C 2228/08* (2013.01); *B23C 2228/10* (2013.01); *B23C 2240/08* (2013.01)

(58) Field of Classification Search
CPC ............ B23C 2224/24; B23C 2226/18; B23C 2224/28; B23C 2228/08; B23C 2228/10
See application file for complete search history.

(56) References Cited

U.S. PATENT DOCUMENTS

| | | | |
|---|---|---|---|
| 2004/0187638 A1* | 9/2004 | Heinrich | C22C 1/053 75/240 |
| 2006/0188346 A1* | 8/2006 | Greenwood | B23C 5/003 407/54 |
| 2008/0124531 A1* | 5/2008 | Hanyu | B23C 5/1009 428/216 |
| 2012/0009028 A1* | 1/2012 | Hobohm | B23C 3/28 407/61 |
| 2012/0093602 A1 | 4/2012 | Osawa et al. | |
| 2014/0255113 A1* | 9/2014 | Davis | B23C 5/10 407/54 |
| 2015/0259782 A1* | 9/2015 | Rachbauer | C23C 14/0641 428/213 |
| 2016/0023284 A1* | 1/2016 | Goldsmith | B23C 5/10 409/131 |
| 2016/0052072 A1* | 2/2016 | Davis | B23C 5/10 409/131 |

OTHER PUBLICATIONS

Written Opinion of the ISA dated Mar. 21, 2017 for corresponding International Application No. PCT/TR2016/050493.

* cited by examiner

END-MILLS MADE OF HARD METAL AND CERAMIC COMBINED BY BRAZING METHOD

CROSS-REFERENCE TO RELATED APPLICATIONS

This application is a U.S. National Phase application, under 35 U.S.C. § 371, of International Application no. PCT/TR2016/050493 with an international filing date of Dec. 13, 2016, and claims benefit of Turkish Application no. 2015/16043 filed on Dec. 14, 2015, and which are hereby incorporated by reference for all purposes.

BACKGROUND

1. Field of Invention

The present invention relates to end-mills that can be made of ceramic or any other high strength and toughness material.

The invention particularly relates to production of end-mills by means of combining ceramic-metal based materials via brazing method.

2. Background Art

In the known status of the art, end-mills are used for chip removal (machining) from various materials such as metal or plastic by means of rotating motion around their own axes. Cylindrically-shaped end-mills are formed of shank which is fixed to the tool holder and cutting portion for shaping the material. The cutting portion has plurality of cutting blades and these blades are separated from each other via flutes (rake channels) for the purpose of removing the chips formed as a result of cutting operation. The blades and flutes can be parallel to the longitudinal axis of the end mill's or can be helical with regard to this axis. The end-mills typically ends with radial cutting edges such that they would complement the cutting effect provided with the axial parts of the blades.

Rotary parts and gas turbine blades in aviation and aerospace industry are made of nickel based super alloys having high temperature strength, good corrosion and oxidation resistance, ductility, superior friction and rupture strength, since they are exposed to high vibration and they are also required to endure thermal stress caused by sudden temperature changes. End mills are manufactured by combining ceramic-metal based materials via brazing method to form a solution potential for deep milling operations of turbine blades especially made of super alloys by combining excellent thermo-mechanical characteristics of ceramic materials and superior vibration damping, strength etc. characteristics of metal materials.

Even though nickel based corrosion and heat resistant alloys are categorized as medium-hard machinable material, they can be machined at satisfactory rates by using conventional machining techniques. However, since nickel alloys exhibit high resistance against cutting forces during milling operations, high temperatures occur on the part surface and the service life of tungsten carbide end mill is over in about 10 minutes. On the other hand, monolithic ceramic end mills have higher machining capability at high temperatures and with high cutting rate. It is observed that the breaking risk of the monolithic ceramic end mills is increased when the length/diameter ratio is more than 2.

In a patent research made about this subject, a patent with Publication No. US20140255113 is encountered. Said invention relates to monolithic end-mills and production methods of such end-mills. In the abstract of the invention:

"End mills are disclosed which may be made monolithically of ceramic or other materials. The cutting portions of the end mills have lengths of cut that are no more than twice their cutting diameters and cores which are at least 0.7 times their cutting diameters. Their axial blades have cutting edges with negative radial rake and are separated by helical flutes. Their cutting ends have negative axial rake and are gashed ahead of center and have radial cutting edges with negative rake. Such end mills also have radiused corners and gashes transitioning from radial to axial at a flute. Methods of milling materials using such ceramic end mills are also disclosed."

The end-mills mentioned in the above given invention abstract are made of monolithic ceramic and is not formed by brazing method. Besides, the ceramic end mills do not have a surface coating. This reduces the service life and abrasion resistance of the end mills and causes chip welding (sticking) problem on the cutting tool during application.

As a result, improvement is to be made in end-mills, and therefore novel embodiments that would eliminate the above said drawbacks and bring solutions to the problems of the prior art systems are needed.

SUMMARY

The invention relates to end-mills, which meet the above said requirements, eliminate all of the drawbacks, and bring some additional advantages.

The primary purpose of the invention is to provide an end-mill that is produced by combining ceramic-metal-based materials via brazing method.

Another purpose of the invention is to extend the ceramic end mill length via brazing method.

With the ceramic-metal based end-mill embodiment; it is aimed to combine the excellent thermo-mechanical characteristics of ceramic materials and the vibration damping, high ductility and toughness etc. superior characteristics of metal materials via brazing method.

Another purpose of the invention is to overcome the problem of breakage encountered in monolithic ceramic end mills in which the length/diameter ratio is greater than 2, by means of combining ceramic-metal based materials via brazing method.

Another purpose of the invention is to enable high speed machining of deep and narrow blade gaps that can only be machined by ceramic-metal brazed end mills having length/diameter ratio greater than 2, in aviation, aerospace and production of gas turbines When the cost of monolithic ceramic end mill is compared with the cost of ceramic-metal based brazed end mills, it can be seen that the end mill costs are lower in production of brazed end mill, since less ceramic component is used in this method. With the cutting tool embodiment according to the invention, it is both aimed to reduce the processing costs of the cutting tools and the manufacturing parts and increase the operational efficiency and profitability.

Another purpose of the invention is to produce the end-mill manufactured by combining ceramic-metal based materials via brazing method in a way that wider helix angel intervals and radial rake angle with regard to prior art products.

With the invention, the end-mill manufactured by combining ceramic-metal-based materials via brazing method, can be Titanium Aluminum Nitride (TiAlN) coated via PVD coating method. In this way, it is aimed to extend the service life and improve abrasion resistance of the cutting tool, and minimize the welding (sticking) problem of chips on the cutting tolls. The cutting tools can also be produced without coating.

In the end-mill according to the invention produced by brazing method on ceramic-metal-based materials, along the longitudinal axis, the helical structure found at the edges of the chip channels continues helically along the longitudinal direction and ends at the web thickness at the cutting edge.

In the end-mill according to the invention produced by combining ceramic-metal-based materials via brazing method, the number of flutes varies between 2 to 8, depending on the cutting diameter.

In the end-mill according to the invention produced by combining ceramic-metal based materials via brazing method, the corner radius in the range of from about 0.1 to about 0.4 times the cutting diameter.

In the end-mill according to the invention produced by combining ceramic-metal-based materials via brazing method, the helical angle is in the range of from about 28° to about 43°, depending on the characteristics of the material to be machined and the cutting parameters.

In the end-mill according to the invention produced by combining ceramic-metal-based materials via brazing method, radial rake angle is in the range of from about −6° to about +6°.

In the end-mill according to the invention produced by combining ceramic-metal based materials via brazing method, axial rake angle is in the range of from about −3° to about +5°.

In the end-mill according to the invention produced by combining ceramic-metal based materials via brazing method, the gash angle is in the range of from about 15 to about 45 degrees.

In the end-mill according to the invention produced by combining ceramic-metal based materials via brazing method, the end rake is in the range of from about −6° to about +6°.

In the end-mill according to the invention produced by combining ceramic-metal-based materials via brazing method, the dish angle is in the range of from about 1° to about 3°.

In order to achieve the above said purposes which would be understood better with the below given detailed description, the present invention is a end-mill comprising a shank and a cutting portion, formed by combining ceramic-metal-based materials via brazing method,
  a cutting diameter varying between 2 to 20 mm,
  at least one web thickness found at a blade part,
  at least one helix angle having a cutting edge thereon,
  a core diameter that is at least 0.7 times the cutting diameter,
  at least one corner radius found at the tip part of the blades and axial and radial rake angles at which cutting operation is made.

The structural and characteristic features of the invention and all of its advantages shall be understood better with the figures and the detailed description given below in reference to the figures, and therefore, the assessment should be made by taking into account the said figures and detailed explanations.

BRIEF DESCRIPTION OF THE DRAWINGS

For better understanding of the embodiment of the present invention and its advantages with its additional components, it should be evaluated together with below described figures.

REFERENCE NUMBERS

A: End-mill
B: Shank
C: Cutting Portion
1. Cutting diameter
2. Shank diameter
3. Helix length
4. Longitudinal axis
5. Corner radius
6. Cutting End
7. Total length
8. Shank length
9. Flute
10. Helix angle
11. Primary relief angle
12. Secondary relief angle
13. Cutting edge
14. Width of primary relief land
15. Width of secondary relief land
16. Core diameter
17. Radial rake angle
18. Web thickness
19. Axial primary relief angle
20. Axial secondary relief angle 21. Radial primary relief angle
22. Radial secondary relief angle
23. Dish angle
24. Gash angle
26. Blades
27. Cutting edge tangent
28. End rake
29. Brazing area

DETAILED DESCRIPTION OF THE INVENTION

In this detailed description, the preferred embodiments of the end-mill (A) according to the invention are only disclosed for better understanding of the subject without forming any limiting effect.

The present invention relates to end-mill (A) that can be made of ceramic or any other material having high strength and toughness. The improvement provided with the invention basically relates to production of ceramic end-mills (A) by means of combining ceramic-metal based materials via brazing method. Additionally, Titanium Aluminium Nitride (TiAlN) coating can be applied via PVD coating method in order to extend the service life of the ceramic cutting portion (C), increase abrasion resistance, and minimize the problem of the chips welding (sticking) to the cutting tools FIG. 1 shows a preferably 4-flute (9) embodiment of the end-mill (A) according to the invention produced by combining ceramic-metal-based materials via brazing method, while FIG. 2 shows the side profile view of the preferably 6-flute (9) embodiment. The end-mill (A) basically consists of a shank (B) for attaching the tool holder and cutting portion (C) for machining the material surface via rotational motion. The end-mill (A) has a cylindrical shape and it is produced by brazing of metal and ceramic based materials. FIG. 8 shows a three-dimensional view of a preferred embodiment of the ceramic-metal-based end-mill (A) according to the invention.

Figure 1:
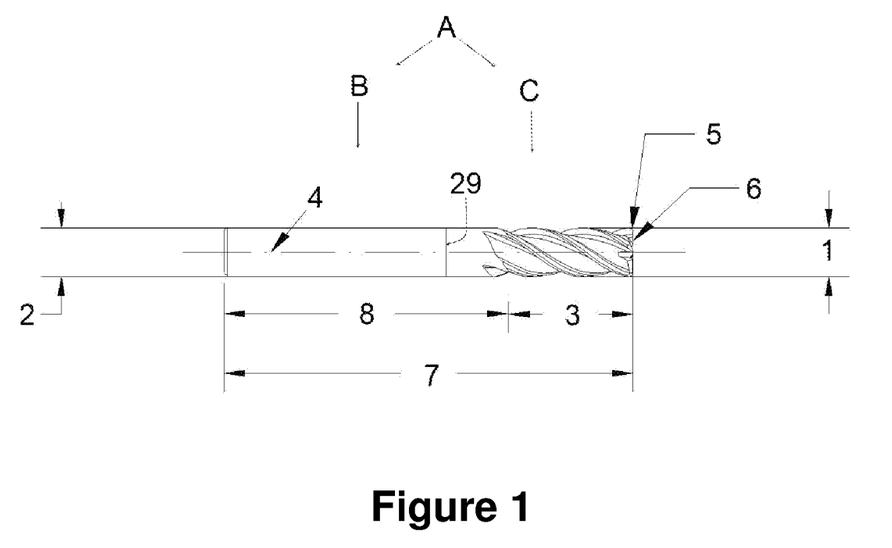
FIG. 1; is the side profile view of the 4-flute embodiment of the end-mill according to the invention produced by combining ceramic-metal-based materials via brazing method.
Figure 2:
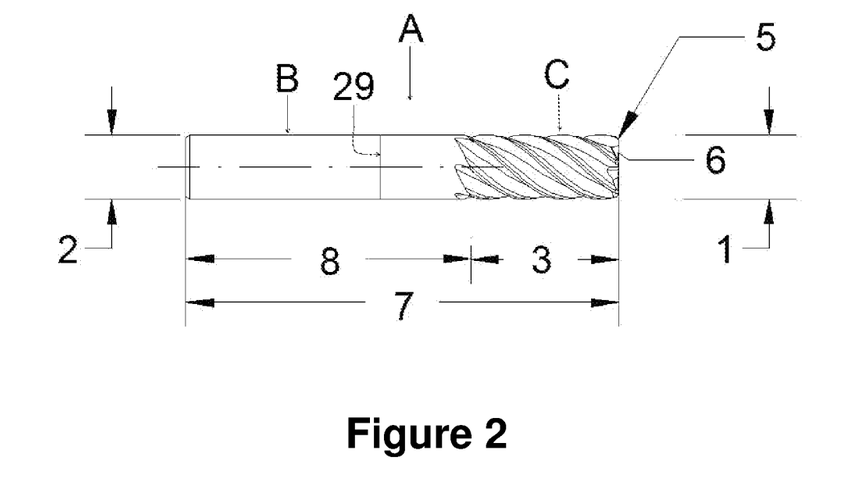
FIG. 2; is the side profile view of the 6-flute embodiment of the end-mill according to the invention produced by combining ceramic-metal-based materials via brazing method.

As can be seen from FIGS. 1 and 2, the ceramic-metal-based end-mill (A) has a cutting diameter (1) comprising blades (26) along the longitudinal axis (4) of its cylindrical body, and a diameter of the shank (2) that is fixed to the holder. While the cutting diameter (1) varies between 2 to 20 mm, the helix length (3) defining the cutting length can be between 1 to 2 times of the cutting diameter (1).

The total length (7) of the end-mill (A) is equal to the summation of the helix length (3) and the shank length (8). At the tip of the cutting portion (C), the cutting end (6) and the corner radius (5) structures shown in FIG. 1 are found.

The shank diameter (2) and the cutting diameters (1) can be same or different from each other in the end-mill (A). The adjacent blades (26) arranged on the helix angle (10) of the end-mill (A) are separated from each other via flute (9) grooves. The blades (26) extending along the longitudinal axis (4) end at the end-mill (A) cutting end (6).

The core diameter (16) of the end-mill (A) can be about 0.70-0.75 times the cutting diameter (1). The blades (26) have a radial rake angle (17) where cutting operation is made and an axial rake angle. The radial rake angle (17) has a negative-positive angle.

Figure 3:
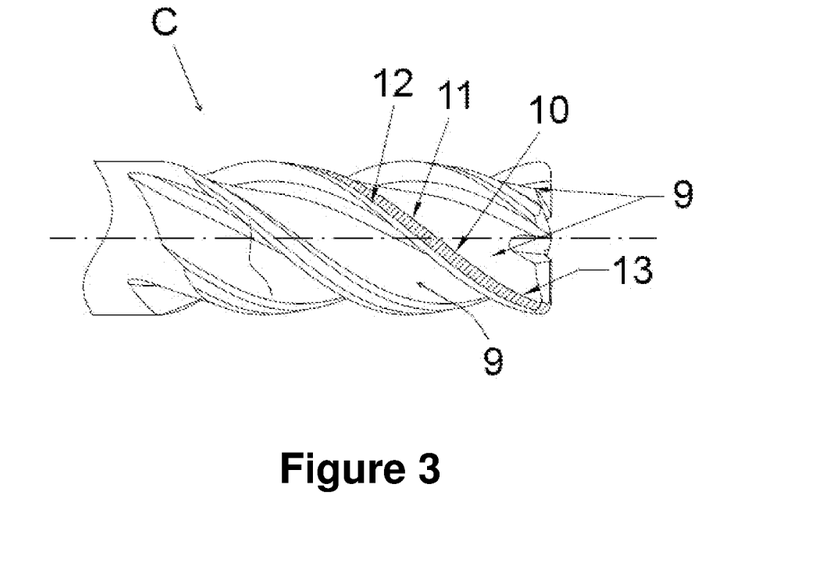
FIG. 3; is the side profile view of the end-mill according to the invention produced by combining ceramic-metal-based materials via brazing method; showing the cutting edges, blades, primary relief angle adjacent to the helix angle and the secondary relief angle.
Figure 4:
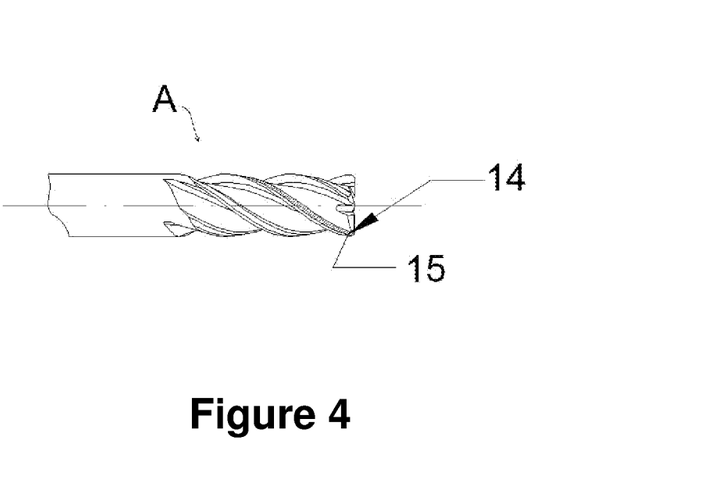
FIG. 4; is the side profile view of the end-mill according to the invention produced by combining ceramic-metal-based materials via brazing method; showing width of primary relief land and axial width of secondary relief land.

In the side profile view of the monolithic end-mill (A) according to the invention given in FIG. 3; the cutting edges (13), 2 to 8 blades (26), the primary relief angle (11) adjacent to the helix angle (10) and the secondary relief angle (12) can be seen. In FIG. 4, the width of axial primary relief land (14) and the width of axial secondary relief land (15) corresponding to the primary relief angle (11) and the secondary relief angle (12), respectively, are shown.

Figure 5:
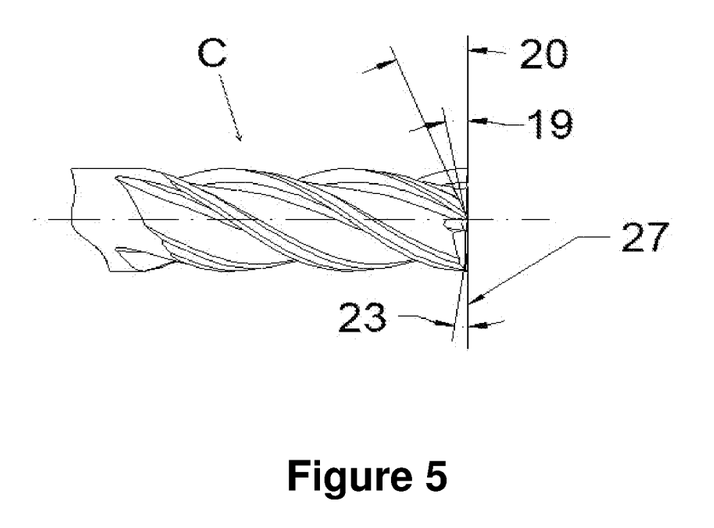
FIG. 5; is the side profile view of the end-mill according to the invention produced by combining ceramic-metal-based materials via brazing method; showing the axial primary relief angle, axial secondary relief angle, and the gear angle dimensioned according to the plain surface that is tangent to the cutting end.

In FIG. 5, the axial primary relief angle (19), the axial secondary relief angle (20), and dish angle (23) dimensioned according to the cutting edge tangent (27) that is tangent to the cutting end (6) in the front part of the end-mill (A) are shown.

Figure 6:
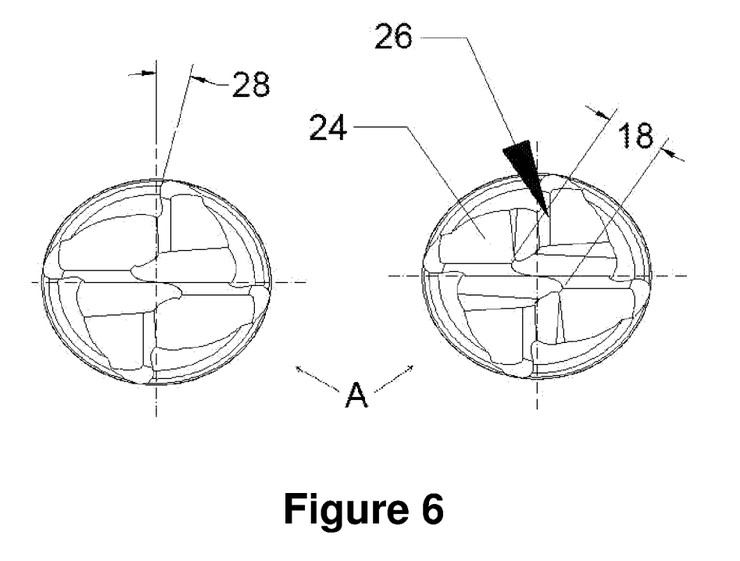
FIG. 6; is the front part view of the end-mill according to the invention produced by combining ceramic-metal-based materials via brazing method; showing the web thickness, gash angle, pods, number of flutes, and end rake.

From the front part view of the end-mill (A) according to the invention produced by combining ceramic-metal-based materials via brazing method given in FIG. 6; the web thickness (18) corresponding to the gap between the flutes (9) found at the cutting end (6), the gash angle (24) corresponding to the angle found at the sides of the blades (26) found at each helix angle (10), and the number of the flutes (9) found at the ends can be seen. FIG. 6 also shows the end rake (28) indicating the end of the radial rake angle (17).

Figure 7:
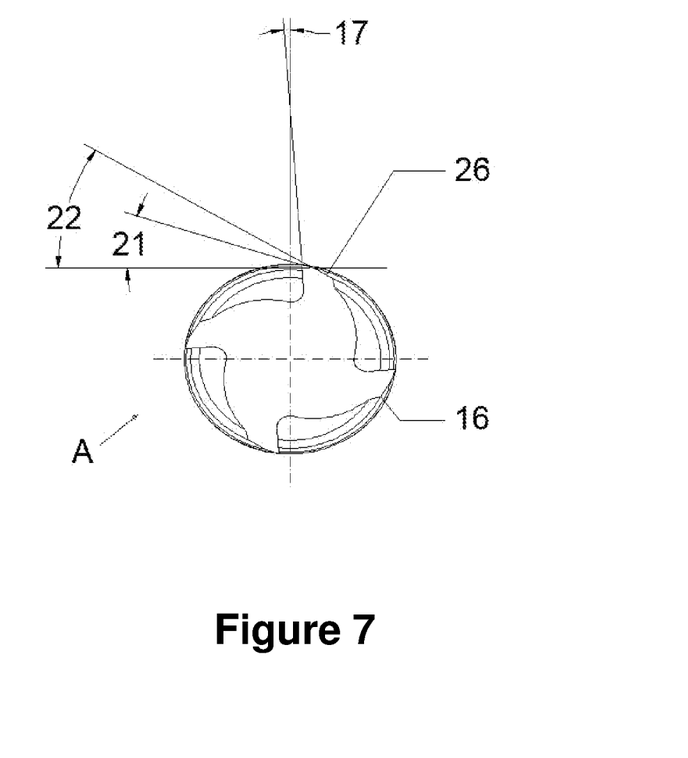
FIG. 7; is the front profile view of the end-mill according to the invention produced by combining ceramic-metal-based materials via brazing method; showing the radial primary relief angle and radial secondary relief angles found beside the blade helix angle, the core diameter and the radial rake angle.
Figure 8:
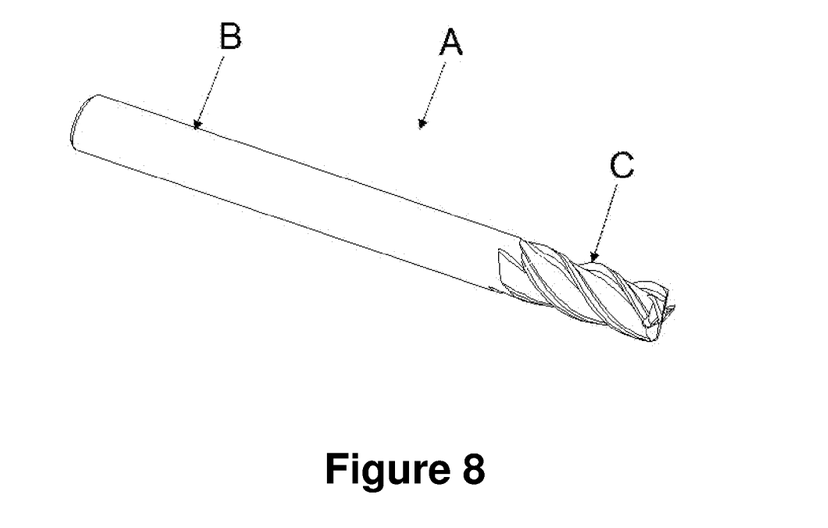
FIG. 8; is a three-dimensional view of a preferred embodiment of the end-mill according to the invention produced by combining ceramic-metal based materials via brazing method.

From the front profile view of the end-mill (A) according to the invention produced by combining ceramic-metal-based materials via brazing method given in FIG. 7; the Radial primary relief angle (21) and Radial secondary relief angle (22) found beside the blade (26) helix angle (10) can be seen.

In the end-mill (A) according to the invention produced by combining ceramic-metal-based materials via brazing method:

The length of the helical cutting portion (C) that is twice the cutting diameter (1) is less than the shank (B),
If the core diameter (16) is 0.7 times the cutting diameter (1), then the helix angle (10) is between 28° to 43° around its axis.
The number of flutes (9) is between 2 to 8.
The end rake (28) angle is between −6° to +6° interval.
The corner radius (5) is about 0.010-0.4 times the cutting diameter (1).
Radial rake angle (17) is between −6° to +6°.
Axial rake angle is approximately between −3° to +5°.
The dish angle (23) varies between 1° to 3°.
The gash angle (24) is between 15° to 45° interval.
Moreover, the cutting diameter (1) is preferred to remain constant along the helix length (3), but it can also be tapered along the helix length (3).
The cutting diameter (1) can have diameters varying between 2 to 20 millimetres and the number of flutes (9) may increase as the cutting diameter (1) increases.

Figure 9:
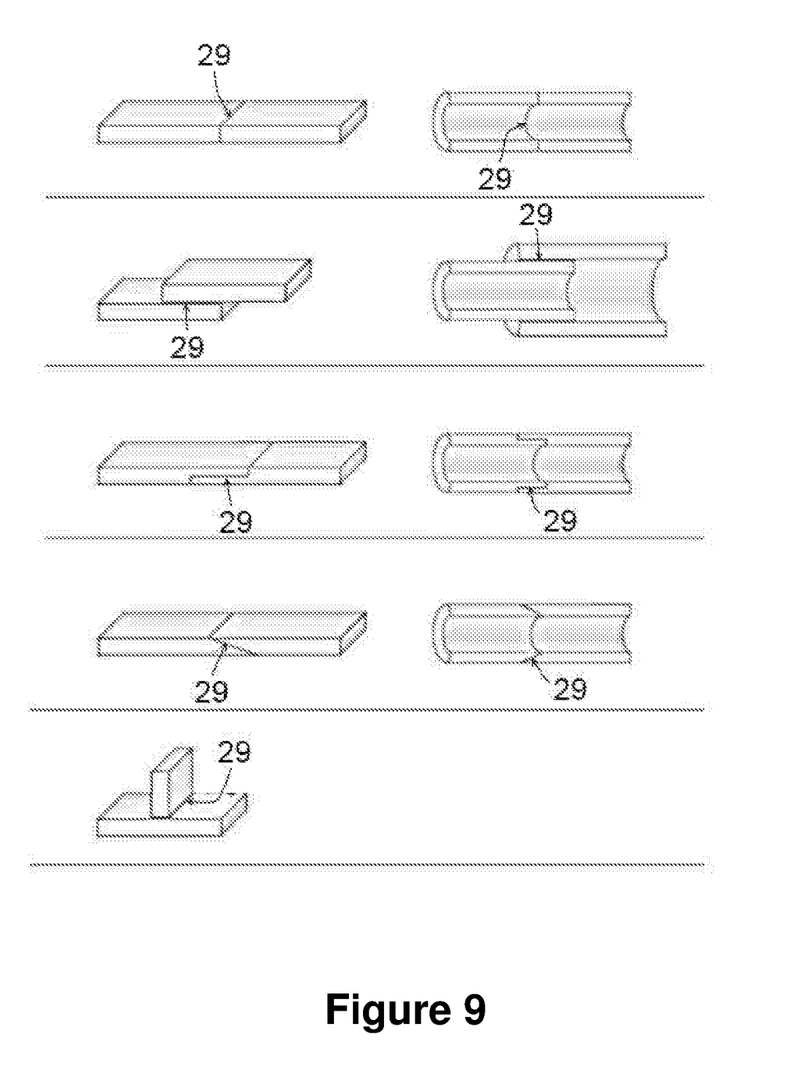
FIG. 9; is the view showing the way of joint design used in combining of ceramic-metal-based materials via brazing method in production of the end-mill according to the invention.

The production steps of the end-mill (A) according to the invention produced by combining ceramic-metal-based materials via brazing method are as follows:

The end-mill (A) according to the invention is formed by combining ceramic and metal-based materials via brazing method. In this regard, first of all, the operation of combining the metal and ceramic materials to be used in end-mill (A) is performed during production. Use of various techniques is possible in combining the metal and ceramic materials with each other via brazing method. In FIG. 9, the joint designs that can be used in the brazing method of metal and ceramic materials are shown. The joint designs provided in FIG. 9 are front joint, lap joint, front-lap joint, scarf joint, and T-joint, respectively, from top to down. While metal material and ceramic material are combined in the production of end-mill (A) according to the invention, the joint design given in FIG. 9 or their other combinations may be used. In FIGS. 1 and 2, the brazing area (29) between the shank (B) and the cutting portion (C) of the ceramic-metal-based end-mill (A) can be seen.

The ceramic-metal based end-mill (A) is obtained by placing brazing material to the brazing area (29) shown in FIG. 9 and then performing brazing operation between 650-730° C. During production of the ceramic-metal based end-mill (A), vacuum oven (vacuum or inert gas medium), induction (vacuum or inert gas medium) can be used as the thermal treatment source. A brazing material formed of the oxides shown in the below given table as recipe A or recipe B should be used as the brazing material. Brazing material can be in paste or thin strip metal sheet form. HSS, tungsten carbide, tool steel, densimet, or low alloy steels above 40 HRC can be used as the shank (B) material of the end-mill (A) manufactured by combining ceramic-metal-based materials via brazing method. As the cutting portion (C) material, Silicon Nitride ($Si_3N_4$) based ceramics, alumina-added silicon carbide whisker, silicon carbide, alpha/beta (20:80 to 80:20) SiAlON ($Si_3N_4+Al_2O_3+AlN+Y_2O_3+Sm_2O_3+CaCO_3$), $Al_2O_3$ can be used.

| Recipe A | | Recipe B | |
|---|---|---|---|
| Oxides | Percent Ingredient (%) | Oxides | Percent Ingredient (%) |
| Ag | 50-75% | Ag | 80-99% |
| Ti | 0-5% | Ti | 0-10% |
| Cu | 20-40% | In | 0-10% |
| In | 0-20% | | |
| Al | 0-2% | | |
| Sn | 0-6% | | |

During milling operation, the problem of the removed chip welding (sticking) on the ceramic cutting portion (C) surface due to formation of high temperature on the surface of the manufacturing part is encountered. In the end-mill (A) according to the invention produced by combining ceramic-metal based materials via brazing method, TiAlN coating is applied by PVD method in order to extend the service life, increase abrasion resistance, and minimize the welding (sticking) problem of chips on the cutting tool.

It is known that the AlN phase having hexagonal lattice structure provides better adhesion over the ceramic material surface than the cubical lattice TlN phase. This means that inter-atomic bonds are formed between the TiAlN coating and the ceramic material. By means of the inter-atomic bonds, the end-mill (A) can easily be polarized during coating. Following coating, the surface hardness and surface roughness of the ceramic material is increased. As a result of trials, it is found out that the chip welding (sticking) problem is reduced on the coated surface. In test studies made at dry 600 m/min cutting speed at a high speed machine, machining is performed on inconel 718 material with the end mill (A) according to the invention and 17.6 $cm^3$/min chips are removed from the material.

Other Improvements Provided with the End-Mill (A) According to the Invention Produced by Combining Ceramic-Metal-Based Materials Via Brazing Method are as Follows:

The cutting diameter (1) of the monolithic end-mill (A) having axial structure is between 2 to 20 mm, A web thickness (18) is found at the blade (26) part of the end-mill (A) and it has a helix angle (10) having a cutting edge (13) thereon, It has a core diameter (16) which is at least 0.7 times the cutting diameter (1), The helical structure found at the edges of the flute (9) along the longitudinal axis (4) continues in a longitudinally helical structure and ends at the web thickness (18) found at the blade (26) part.

A corner radius (5) is found at the tip part of the blades (26) between the plurality of flutes (9) and axial and radial rake angles (17) are found where cutting operation is made, The helix length (3) indicating the cutting length is about 1 to 2 times of the cutting diameter (1), The number of flutes (9) vary between 2 to 8, depending on the end mill (A) diameter, The corner radius (5) is between 0.01 to 0.4 times of the cutting diameter (1), The helix angle (10) can be from 28 to 43 degrees, depending on the characteristics of the material to be machined.

The radial rake angle (17) is between −6° to +6° interval, the axial rake angle is between −3° to +5° interval, the gash angle (24) is between 15° to 45° interval, the end rake (28) angle found at the front part of the milling cutter set is between −6° to +6° interval, the dish angle (23) at the blade part of the flutes (9), that is to say, the pit angle is between 1° to 3°.

In the end-mill (A) according to the invention produced by combining ceramic-metal based material via brazing method, the excellent thermo-mechanical characteristics of ceramic materials and the vibration damping, high ductility and toughness etc. superior characteristics of metal materials are combined via brazing method. The length of the cutting tool could be extended by developing the ceramic-metal based end-mill form and the problem of breakage encountered in monolithic ceramic end-mills (A) due to the length/diameter ratio is greater than 2 is overcame. High speed machining of deep and narrow blade gaps that can only be achieved by end mills which have length/diameter ratio greater than 2 is enabled with ceramic-metal based end-mill (A) in production of aviation, aerospace, and gas turbine blades.

When the cost of monolithic ceramic end mill is compared with the cost of ceramic-metal based brazed end mills, it can be seen that the end mill costs are lower in production of brazed end mill, since less ceramic component is used in this method. With the end mill (A) embodiment according to the invention produced by joining ceramic-metal based materials via brazing method, both the processing costs of the end mill (A) and the manufacturing parts are reduced and the operational efficiency and profitability are increased.

The invention claimed is:

1. An end-mill (A) comprising a shank (B) and a cutting portion (C), in which said cutting portion (C) comprises:
   a cutting diameter (1) varying between 2 to 7 mm or 13 to 20 mm,
   at least one web thickness (18) found at a blade (26) part,
   at least one helix angle (10) having a cutting edge (13) thereon,
   a core diameter (16) that is at least 0.8 times the cutting diameter (1),
   at least one corner radius (5) found at a tip part of the blade (26) part, between a plurality of flutes (9) and an axial rake angle and radial rake angle (17) at which a cutting operation is made;
   wherein, said shank (B) and said cutting portion (C) are combined to each other by using metal and ceramic-based materials via a brazing method, wherein between the shank and the cutting portion is located a brazing area that includes a brazing material which joins the shank with the cutting portion, and a Titanium Aluminium Nitride (TiAlN) coating is applied on said end-mill (A) by a PVD method to form inter-atomic bonds between the TiAlN coating and the ceramic-based material;

further wherein, the helix angle (10) varies from 28° to 39°, depending on characteristics of a material to be machined, the radial rake angle (17) is between −6° to −3° or −1° to +6° interval, the axial rake angle is between −3° to +1° or +3° to +5° interval, a gash angle (24) is between 28° to 45° interval, and an end rake (28) angle at a front part of the end mill is between −6° to +1° interval.

2. The end-mill (A) according to claim 1, characterized in that, a helical structure found at edges of the plurality of flutes (9) along a longitudinal axis (4) continues in a longitudinally helical structure and ends at the web thickness (18) found at the blade (26) part.

3. The end-mill (A) according to claim 1, characterized in that, a helix length (3) is about 1 to 2 times the cutting diameter (1).

4. The end-mill (A) according to claim 1, characterized in that, a number of blades (26) varies between 2 to 8, depending on the cutting diameter (1).

5. The end-mill (A) according to claim 1, characterized in that, the corner radius (5) is between 0.15 to 0.4 times the cutting diameter (1).

6. The end-mill (A) according to claim 1, characterized in that, a dish angle (23) at an opening part of the flutes (9) is between 1° to 3°.

7. The end-mill (A) according to claim 1, characterized in that, the end mill comprises a front joint type in joining metal and ceramic pieces by the brazing method.

8. The end-mill (A) according to claim 1, characterized in that, the end mill comprises a lap joint type in joining metal and ceramic pieces by the brazing method.

9. The end-mill (A) according to claim 1, characterized in that, the end mill comprises a front-lap joint type in joining metal and ceramic pieces by the brazing method.

10. The end-mill (A) according to claim 1, characterized in that, the end mill comprises a scarf joint type in joining metal and ceramic pieces by the brazing method.

11. An end-mill (A) comprising a shank (B) and a cutting portion (C), in which said cutting portion (C) comprises:

a cutting diameter (1) varying between 2 to 7 mm or 13 to 20 mm, at least one web thickness (18) found at a blade (26) part, at least one helix angle (10) having a cutting edge (13) thereon, a core diameter (16) that is at least 0.8 times the cutting diameter (1), at least one corner radius (5) found at a tip part of the blade (26) part between a plurality of flutes (9) and an axial rake angle and radial rake angle (17) at which a cutting operation is made;

wherein, the end mill comprises a joint type in joining metal and ceramic pieces by a brazing method, wherein between the shank and the cutting portion is a brazing area that includes a brazing material which joins the shank with the cutting portion, wherein the joint type is selected from the group consisting of front joint type, lap joint type, front-lap joint type and scarf joint type.

12. The end-mill (A) according to claim 11, characterized in that, a helical structure found at edges of the plurality of flutes (9) along a longitudinal axis (4) continues in a longitudinally helical structure and ends at the web thickness (18) found at the blade (26) part.

13. The end-mill (A) according to claim 11, characterized in that, a helix length (3) is about 1 to 2 times the cutting diameter (1).

14. A brazed end-mill (A) of combined metal and ceramic-based materials, comprising a shank (B) and a cutting portion (C), in which said cutting portion (C) comprises:

a cutting diameter (1) varying between 2 to 7 or 13 to 20 mm, at least one web thickness (18) found at a blade (26) part, at least one helix angle (10) having a cutting edge (13) thereon, a core diameter (16) that is at least 0.8 times the cutting diameter (1), at least one corner radius (5) found at a tip part of the blade (26) part, between a plurality of flutes (9) and an axial rake angle and radial rake angle (17) at which a cutting operation is made;

wherein between the shank and the cutting portion is a brazing area that includes a brazing material which joins the shank with the cutting portion to form the brazed end mill of combined metal and ceramic-based materials.

15. The brazed end-mill (A) according to claim 14, further comprising a Titanium Aluminium Nitride (TiAlN) coating applied by a PVD method to form inter-atomic bonds between the TiAlN coating and the ceramic-based material.

* * * * *